United States Patent
Abraham et al.

(10) Patent No.: US 11,436,351 B1
(45) Date of Patent: Sep. 6, 2022

(54) HOMOMORPHIC ENCRYPTION OF SECURE DATA

(71) Applicant: BAE Systems Information and Electronic Systems Integration Inc., Nashua, NH (US)

(72) Inventors: Jibu Abraham, San Diego, CA (US); Kevan O. Vanhoff, Portland, OR (US); Benjamin Kapp, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 279 days.

(21) Appl. No.: 16/718,603

(22) Filed: Dec. 18, 2019

(51) Int. Cl.
  *G06F 21/60* (2013.01)
  *G06F 16/903* (2019.01)
  *H04L 9/00* (2022.01)

(52) U.S. Cl.
  CPC ...... *G06F 21/606* (2013.01); *G06F 16/90335* (2019.01); *G06F 21/602* (2013.01); *H04L 9/008* (2013.01)

(58) Field of Classification Search
  CPC ............. G06F 21/606; G06F 16/90335; G06F 21/602; H04L 9/008
  See application file for complete search history.

(56) References Cited

U.S. PATENT DOCUMENTS

| | | | |
|---|---|---|---|
| 7,668,812 B1 * | 2/2010 | Riley ................ | G06F 16/24573 707/754 |
| 2013/0262863 A1 * | 10/2013 | Yoshino ............ | G06F 16/24553 713/165 |
| 2017/0124348 A1 * | 5/2017 | Pourzandi ............... | H04L 9/008 |
| 2017/0366519 A1 * | 12/2017 | Rao ...................... | H04L 63/0464 |
| 2018/0198601 A1 * | 7/2018 | Laine .................. | G06F 9/30014 |
| 2018/0212933 A1 | 7/2018 | Williams | |
| 2019/0042786 A1 | 2/2019 | Williams et al. | |

OTHER PUBLICATIONS

Gentry,Craig. "Computing Arbitrary Functions of Encrypted Data," IBM T.J. Watson Research Center. Copyright, 2008 ACM. 8 pages.

* cited by examiner

*Primary Examiner* — Meng Li
(74) *Attorney, Agent, or Firm* — Finch & Maloney PLLC; Gary McFaline (57) ABSTRACT

A process for securely processing a search query for homomorphically encrypted search results is provided. The process includes receiving a search query from a requesting device, the search query including a request for encrypted data stored in a data store operably coupled to the one or more processors. The process further includes executing a search function to access a set of search results from the data store, the search results including homomorphically encrypted information, and determining, based upon the search query, a transmission encryption technique for secure transmission of the search results to the requesting device. The search results can be additionally encrypted using the transmission encryption technique to generate an additionally encrypted search response that includes the homomorphically encrypted information. The process can further include causing transmission of the additionally encrypted search response to the requesting device.

20 Claims, 8 Drawing Sheets

HOMOMORPHIC ENCRYPTION OF SECURE DATA

BACKGROUND

With the onset of the digital age, communication between interconnected devices over communication networks is becoming widespread. Countless times a day, devices communicate with each other to relay information. Oftentimes, the communication involves transmission of data that is sensitive to the sender and/or receiver. In such cases where the information is of a sensitive nature, encryption techniques can be employed to secure the data in such a way that only authorized parties can access the data and those who are not authorized cannot. In certain examples, some encryption techniques or network architectures require decrypting data and re-encrypting the data using another technique and/or another encryption key. Depending on the technical capability of a given eavesdropper, however, during the time the data is decrypted it is vulnerable to unauthorized access.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification but are not intended to limit the scope of the disclosure. The drawings, together with the remainder of the specification, serve to explain principles and operations of the described and claimed aspects and examples. For purposes of clarity, not every component may be labeled in every figure.

DETAILED DESCRIPTION

A process for securely processing a search query for homomorphically encrypted search results is described herein. For example, the process can be integrated into a computer program product or a device configured to receive and process search queries. In certain examples, the process for securely processing a search query for homomorphically encrypted search results includes receiving a search query from a requesting device, the search query including a request for encrypted data stored in a data store operably coupled to the one or more processors. The process further includes executing a search function to access a set of search results from the data store, the search results comprising homomorphically encrypted information, and determining, based upon the search query, a transmission encryption technique for secure transmission of the search results to the requesting device. The search results can be additionally encrypted using the transmission encryption technique to generate an additionally encrypted search response. The process can further include causing transmission of the additionally encrypted search response to the requesting device. A number of variations and embodiments will be appreciated in light of this disclosure.

General Overview

Given the recognized importance of maintaining the security and integrity of digital data, significant resources have been devoted to developing data security technologies to resist malicious attacks and other potentially compromising events. While secure and reliable digital storage technologies have been proposed for data at rest as well as data in transit, it is important to recognize that the data should also be secure during consumption by a receiving device. For example, sensitive data, such as credit card information, will ideally be secured during usage at the point of sale as well as when stored and during communication of such data to a bank or clearing house. However, depending upon the security requirements of, for example, the point of sale network and/or device and the bank network and/or computing device, the credit card information can require multiple instances of encryption and decryption. While decrypted, the credit card information can be vulnerable to exploitation by unauthorized parties. Thus, there is a need for encryption techniques that allow sensitive information to be received and processed by authorized parties, without making that information vulnerable to unauthorized access. For instance, consider the example case where a chain of different services from different companies could calculate 1) the tax, 2) the currency exchange rate, and 3) the shipping costs, on a transaction, without exposing unencrypted sensitive information to any of those authorized services.

Thus, techniques are provided herein for providing homomorphic encryption of secure data during storage and consumption (while data is processed by the intended or authorized recipient), according to some embodiments. The homomorphic encryption techniques can be used to provide, for example, enhanced data integrity, authentication, and authorization with cross domain capabilities, as will be appreciated in light of this disclosure.

In an example embodiment, a communication device such as a remote security server includes an input/output interface configured to receive incoming data from one or more sending devices and to transmit outgoing data to one or more recipient devices, one or more non-transitory machine-readable mediums configured to store instructions, and one or more processors operably coupled to the input/output interface and the one or more non-transitory machine-readable mediums. The one or more processors are configured to execute the instructions stored on the one or more non-transitory machine-readable mediums, wherein execution of the instructions causes the one or more processors to receive a data query, the data query requesting one or more pieces of encrypted data stored in a data store such as a database or other similar data structure. For example, the one or more pieces of encrypted data can be stored using a homomorphic encryption technique as described herein. In certain implementations, the query can also include information related to encryption and decryption capabilities of the requesting device. For example, the query can also include a copy of a public key for encrypting the results of the query for secure transmission to the requesting device. The instructions further cause the one or more processors to identify the results of the query in the database and to encrypt the results of the query using, for example, the public key received along with the query, according to an embodiment. Such a process provides for an additional layer of encryption in addition to the previously applied homomorphic encryption. The instructions can then cause the one or more processors to process the additionally encrypted data prior to transmission. The additionally encrypted and processed message can then be transmitted to the requesting device or otherwise dispatched for its further intended purpose.

Homomorphic encryption is a form of encryption that allows computations to be carried out on cipher text, thus generating an encrypted result which, when decrypted, matches the results that would be achieved if the same operations were performed on plain text that directly corresponds to the cipher text. This feature of homomorphic encryption can be a desirable feature in modern communication system architectures. For example, homomorphic encryption can allow for the chaining together of different services without exposing data to each of those services. For example, a chain of different services from different companies can include calculation of 1) tax, 2) a currency exchange rate, and 3) shipping rates for a transaction without exposing unencrypted data associated with the transaction to any of those services.

Homomorphic encryption schemes and techniques are malleable by design. This flexibility enables their use in cloud computing environments for ensuring the confidentiality of processed data. In addition, the homomorphic property of various cryptosystems can be used to create many other secure systems, for example secure voting systems, collision-resistant hash functions, private information retrieval schemes, and many more. Rather than being limited to one type of operations only, homomorphic encryption schemes can perform any computation function on encrypted data that could be performed on the unencrypted data, without ever needing to reveal the encrypted data. For example, the computational flexibility of homomorphic encryption schemes allows for homomorphic encryption of encrypted data as will be appreciated in light of this disclosure.

There are various functions that can be used for homomorphic encryption. One example includes the Rivest-Shamir-Adleman (RSA) cryptosystem which utilizes a public/private key pair. Another example of a function for homomorphic encryption is the Paillier cryptosystem, which is a probabilistic asymmetric algorithm for public key cryptography. In certain implementations, the Paillier cryptosystem can be used as an additive cryptosystem where, given only the public key and the encryption of $m_1$ and $m_2$ (where $m_1$ and $m_2$ is message data), one can compute the encryption of $m_1$ and $m_2$. Additionally, various computations in the Paillier cryptosystem provide known results that can be exploited for homomorphic encryption. For example, the product of two cipher texts will decrypt to the sum of their corresponding plain texts. Similarly, an encrypted plain text multiplied by a constant k will decrypt to the product of the plain text and the constant k. These, and other similar computational rules associated with homomorphic encryption, provide for the ability to perform numerous features on encrypted data without sacrificing the security of the data.

It should be noted that RSA and Paillier are described above by way of example only. Additional homomorphic functions such as the ElGamal cryptosystem, the Goldwasser-Micali cryptosystem, the Benaloh cryptosystem, and other similar homomorphic encryption schemes can be used to perform the homomorphic encryption as described herein.

In one example use case, for instance, assume a first user (herein after termed "Alice") that is on a trusted network such as a company-controlled Intranet wants to access and manipulate secured data stored in a data store. A second user (herein after termed "Bob") that is currently on another trusted network such as a second company-controlled Intranet may also want to access and manipulate the same secured data as Alice. Alice can use a computing device (sometimes referred to herein as a "requesting device," "requesting computer," or "data transmission device") to transmit a query to a computing device (sometimes referred to herein as an "receiving device" or "receiving computer") that is associated with or otherwise configured to access the secured data in the data store. The requesting device can apply a particular set of security protocols to the query prior to sending that can be used to both secure the data during transmission but also provide data integrity and message authentication when received by the receiving device. Bob can use a second requesting device to submit a similar query to the receiving device for access to the secured data.

To continue the above example, each of Alice and Bob can be processing a portion of a consumer purchase, for instance. For example, Alice can be calculating the amount of tax that should be added to the purchase and Bob can be calculating the shipping that should be added to the purchase. However, neither Alice nor Bob may have the security clearance to access the secured details of the purchase and, as such, cannot decrypt the initial homomorphic encryption of the secured information, i.e., the purchase details. As described above, though, homomorphic encryption techniques allow for manipulation of the homomorphically encrypted data without prior decryption of the homomorphic encryption. As such, Alice can receive a copy of the homomorphically encrypted purchase details and perform a calculation of the tax that should be added to the purchase total without decrypting the homomorphic encryption. Similarly, Bob can receive a copy of the homomorphically encrypted purchase details and perform a calculation of the shipping that should be added to the purchase total without decrypting the homomorphic encryption. Each of Alice and Bob can return their modified values which can be added or otherwise returned to the data store. However, to improve data security during transmission, additional encryption such as AES-256 encryption can be used during transmission as described hereinbelow.

Thus, the foregoing framework provides a robust multi-device security protocol for processing and transmitting, for example, personal, secure or classified information (collectively, sensitive information) from a data store to the requesting device that provides high assurance of the security of the data during access and transmission. The added security resulting from the additional encryption techniques being performed by the security server prior to data transmission provides for an added level of data security, according to an embodiment. As such, the disclosed techniques can be used to improve the security and integrity of data communication by providing enhanced data integrity, authentication, and authorization. These and other advantages and alternative embodiments will be apparent in light of this disclosure.

System Architecture

Figure 1A:
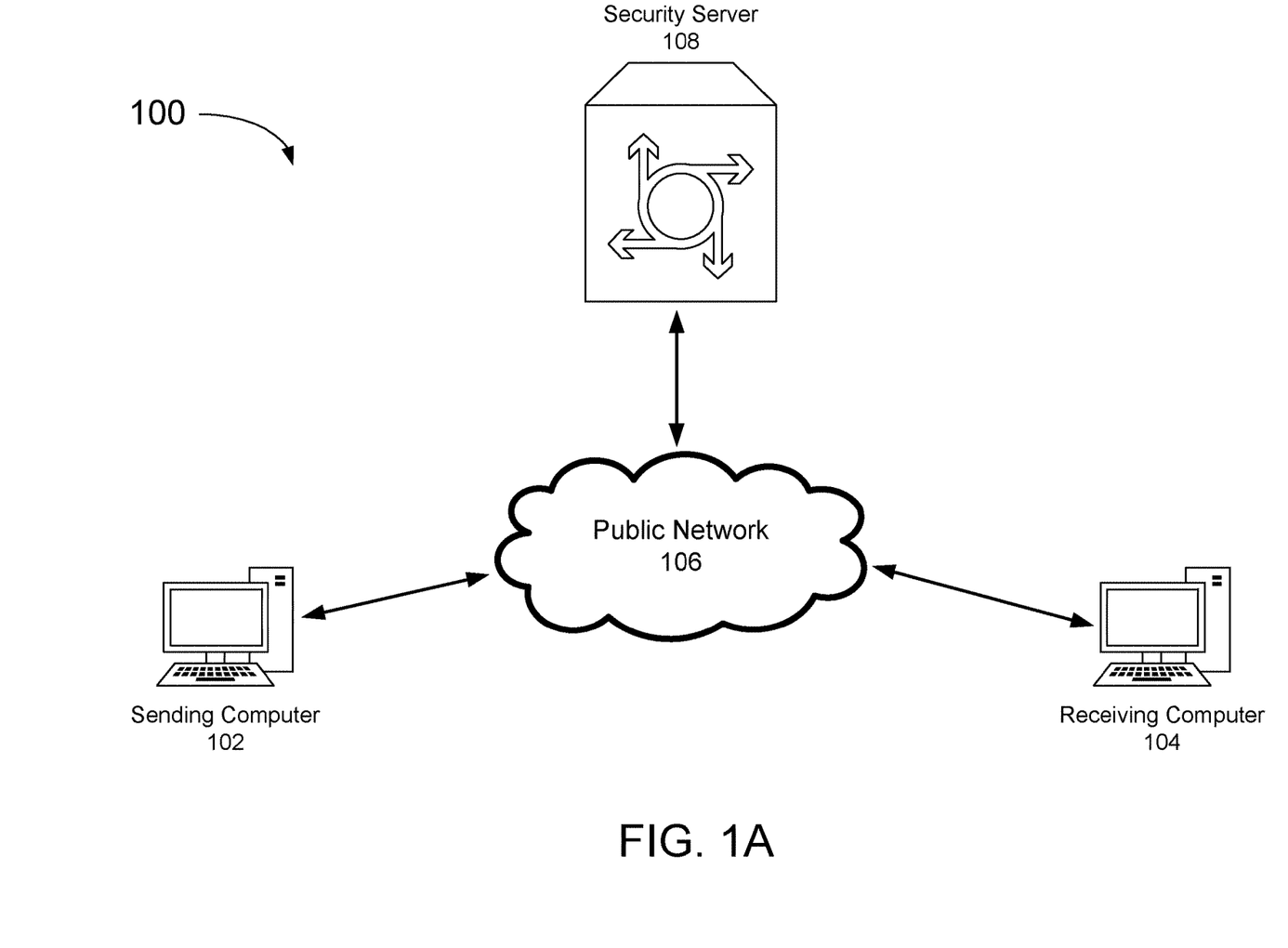
FIG. 1A depicts a schematic illustration of a sample network for transmitting secure data, in accordance with an embodiment of the present disclosure.

Turning now to the figures, FIG. 1A is a schematic illustration of a sample network for transmitting secure data. More specifically, network 100 as shown in FIG. 1A illustrates a sample architecture for implementing the homomorphic encryption querying, storage, and data transmission techniques as described herein. In network 100, a user of a computing device such as sending computer 102 can securely transmit a message to one or more intended recipients. For example, as shown in FIG. 1A, a sender can securely transmit a message to receiving computer 104. In certain implementations, the sending computer 102 can be located in a first secure network such as a company-controlled Intranet. The recipient computer 104 can be located in a public or untrusted network such as the Internet or, as shown in FIG. 1A, can be operably connected to the sending computer 102 via a network 106 such as the Internet. In certain implementations, the receiving computer 104 can be located in a secure network such as a second company-controlled Intranet located at a remote location from the sending computer 102 and, as shown in FIG. 1A, can be coupled to the sending computer via network 106.

The network 106 can further include a security server 108 configured to provide enhanced security features such as data traffic monitoring and re-encryption. For example, the security requirements of the sending computer 102, or the sending computer's network, can vary from the security requirements of the receiving computer 104, or the receiving computer's network. In such an example, the security server 108 can be configured to intercept and process data sent between the sending computer 102 and the receiving computer 104 to ensure that the security of the data (e.g., the encryption technique used) is adjusted accordingly so that the receiving computer 104 can receive and decrypt the data. In some examples, the sending computer 102 can be unaware of the security requirements of the receiving computer 104 or unable to satisfy the security requirements of the receiving computer. In such an example, the security server 108 can be configured to receive encrypted data from the sending computer 102 and process accordingly for transmission to the receiving computer 104. Such examples are described in greater detail below in the discussions of FIGS. 2-5.

As further shown in FIG. 1A, the security server can be located in a remote location from both sending computer 102 and receiving computer 104 and operably coupled to both via the network 106. However, it should be noted that this arrangement is provided by way of example only. In certain implementations, the location of the security server 108 can vary from that as shown in the example network 100. For example, the security server 108 can be located within the same network as the sending computer 102. In another example, the security server 108 can be located within the same network as the receiving computer 104.

In certain implementations, in order to provide secure data transfers with enhanced integrity, authentication, and authorization across multiple domains (e.g., one or more secure networks and a public network such as the example shown in FIG. 1A), all data transferred between the sending computer and the receiving computer (or, alternatively, a set of data having a specific security or confidentiality level) can be first directed to the security server for authorization, authentication, and, if necessary, re-encryption, and then can be directed to the receiving computer.

Figure 1B:
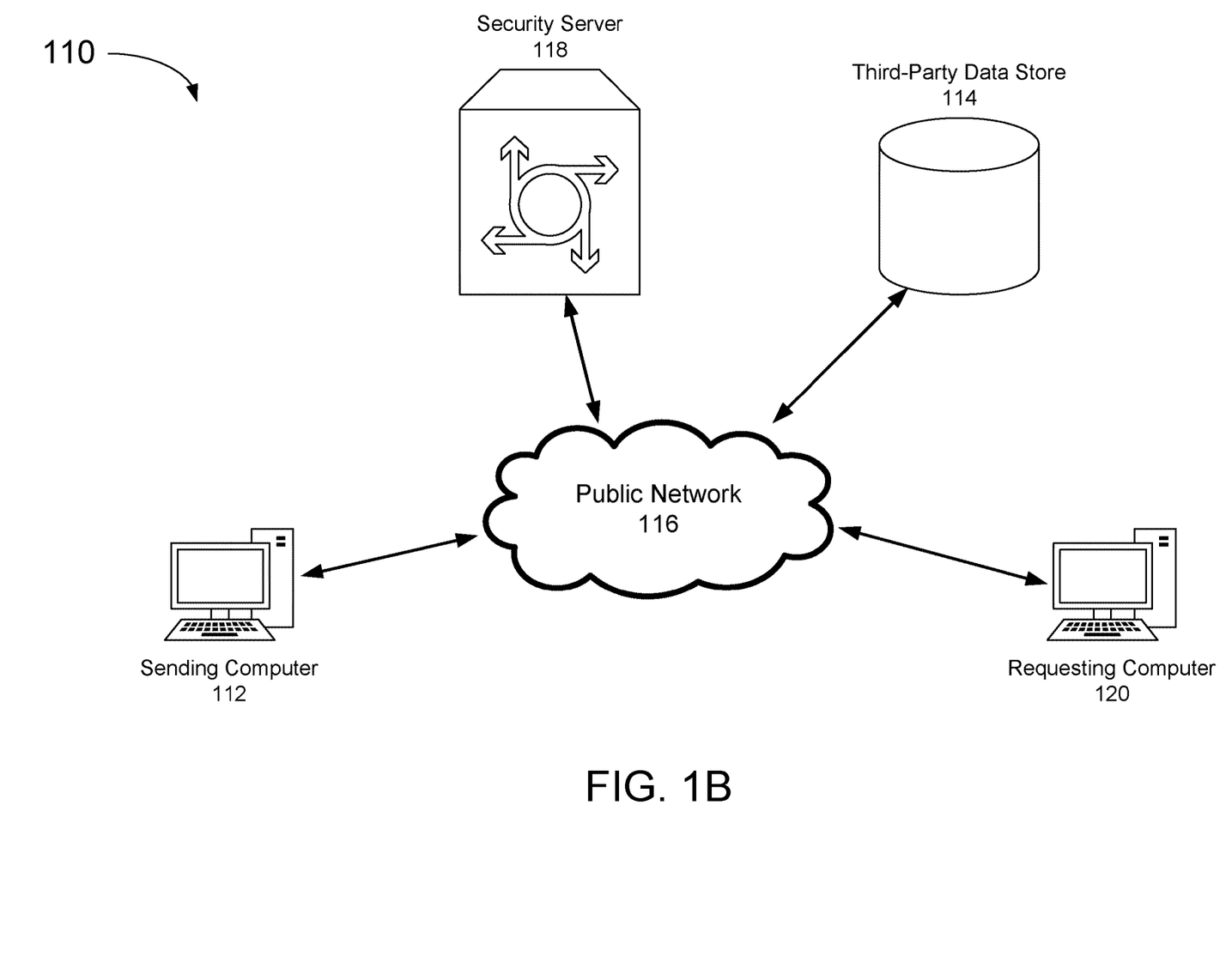
FIG. 1B depicts a schematic illustration of a sample network for transmitting and storing secure data, in accordance with an embodiment of the present disclosure.

In certain examples, data can be encrypted prior to storage at, for example a remote storage facility such as a cloud-based storage device. FIG. 1B is a schematic illustration of a sample network for transmitting and securely storing data, in accordance with an embodiment of the present disclosure. More specifically, network 110 as shown in FIG. 1B illustrates a sample architecture for implementing the homomorphic encryption techniques as described herein prior to storing data for remote access. In network 110, a user of a computing device such as sending computer 112 can securely transmit data for secure storage on a remote data storage device. For example, as shown in FIG. 1B, a sender can securely transmit data to third-party data store 114. In certain implementations, the sending computer 112 can be located in a network such as a company-controlled Intranet. The third-party data store 114 can be located in a public or untrusted network such as the Internet or, as shown in FIG. 1B, can be operably connected to the sending computer 112 via a public network 116 such as the Internet. In certain implementations, the third-party data store 114 can be located in a network such as a second company-controlled Intranet located at a remote location from the sending computer 112 and, as shown in FIG. 1B, can be coupled to the sending computer via public network 116.

To implement the techniques as described herein, the network 116 can further include a security server 118 configured to provide enhanced security features such as homomorphic encryption of received data. As shown in FIG. 1B, the security server 118 can be located in a remote location from both sending computer 112 and third-party data store 114 and operably coupled to both via the public network 116. However, it should be noted that this arrangement is provided by way of example only. In certain implementations, the location of the security server 118 can vary from that as shown in the example network 110. For example, the security server 118 can be located within the same network as the sending computer 112. In another example, the security server 118 can be located within the same network as the third-party data store 114.

In certain implementations, in order to provide secure data transfers with enhanced integrity, authentication, and authorization across multiple domains (e.g., one or more private networks and a public network such as the example shown in FIG. 1B), all data transferred between the sending computer and the third-party data store 114 (or, alternatively, a set of data having a specific security or confidentiality level) can be first directed to the security server for authorization, authentication, and, if necessary, encryption such as homomorphic encryption, and then can be directed to the third-party data store.

For example, the third-party data store 114 can be configured to store sensitive information such as military information, banking information, medical records, employee records, classified government information, and other similar sensitive information. To protect the data when stored, the data can be encrypted using an encryption technique such as homomorphic encryption prior to storage in the third-party data store 114. In some examples, the security server 118 can receive encrypted data from the sending computer 112. The security server 118 can be configured to decrypt the original encryption and re-encrypt the received data using a homomorphic encryption technique as described herein prior to storage.

Additionally, as shown in FIG. 1B, the network 110 can also include a requesting computer 120 configured to transmit a query or request for data to the security server 118 for access to data stored on the third-party data store 114. As described above, by directing all data queries through the security server 118, additional security can be provided for the data stored on the third-party data store 114.

In such an example, the security server 118 can be configured to obtain the requested data from the third-party data store 114. The security server 118 can be configured to verify the requested data as received from the third-party data store 114 and additionally encrypt the requested data using an alternative encryption technique, in addition to the previously applied homomorphic encryption, that can be decrypted by the requesting computer 120. Using the encryption techniques as described herein, the security server 118 can additionally encrypt the requested data without potentially exposing the requested data to unauthorized access by maintaining the previously applied homomorphic encryption.

Methodology and Process Flow

Figure 2:
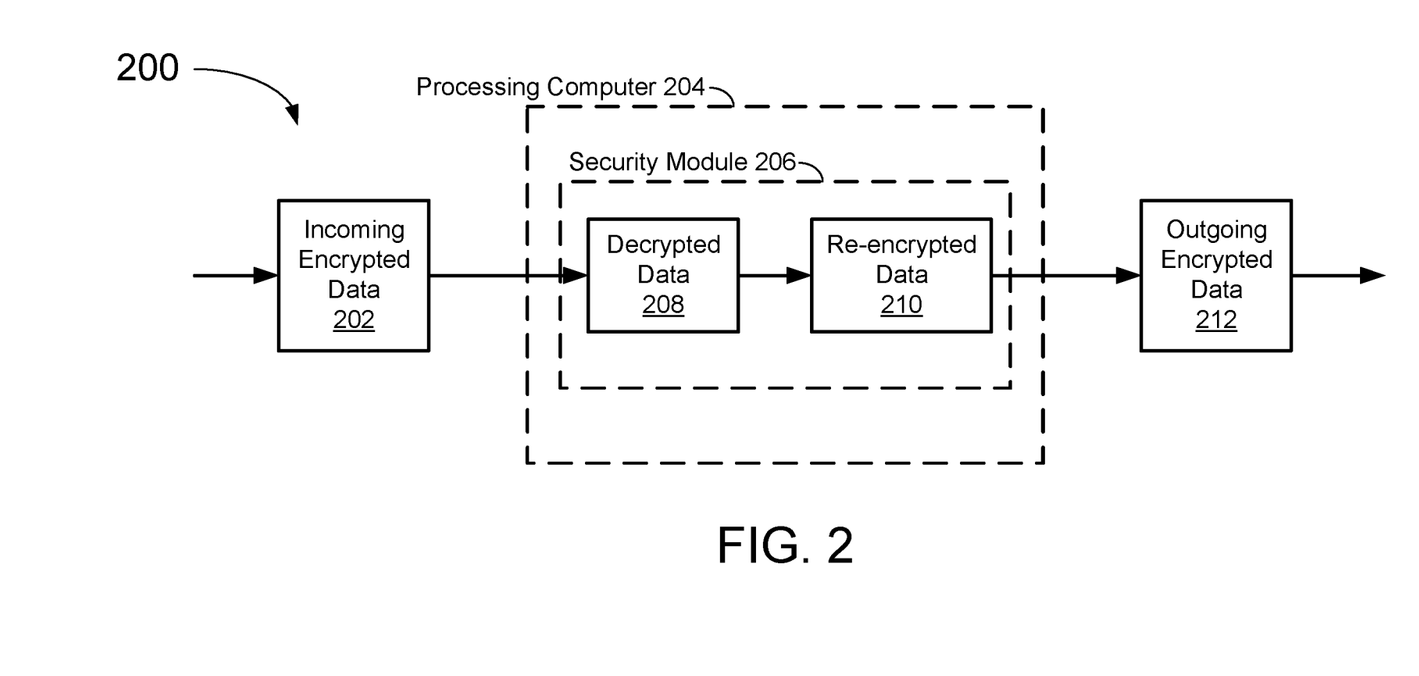
FIG. 2 depicts a data flow diagram illustrating an example data flow for re-encryption of previously encrypted data.

FIG. 2 illustrates a sample data flow in an encryption process 200 that allows data to be vulnerable during processing of that data. For example, as shown in FIG. 2, data can be accessed and retrieved from a data store, the data including incoming encrypted data 202. The incoming encrypted data can be received by a processing computer 204 (e.g., one of security servers 108 or 118 as described above) for processing. The processing computer 204 can initiate a software module such as security module 206 for processing the incoming encryption data 202. For example, the security module 206 can include instructions for causing a processor of the processing computer 204 to decrypt the incoming encrypted data 202 to generate decrypted data 208. After processing is completed, the security module 206 can further include instructions for causing the processor to re-encrypt the decrypted data 208, thereby generating re-encrypted data 210. The processing computer can perform additional processing on the re-encrypted data 210 and cause transmission of outgoing encrypted data 212 to an intended recipient device.

While process 200 includes means for securely receiving the incoming encrypted data 202 and securely transferring the outgoing encrypted data 212, the process suffers from various drawbacks. Mainly, the process 200 includes a period of time where the originally received incoming encrypted data 202 is decrypted and, as such, is unprotected and vulnerable to unauthorized access.

Figure 3:
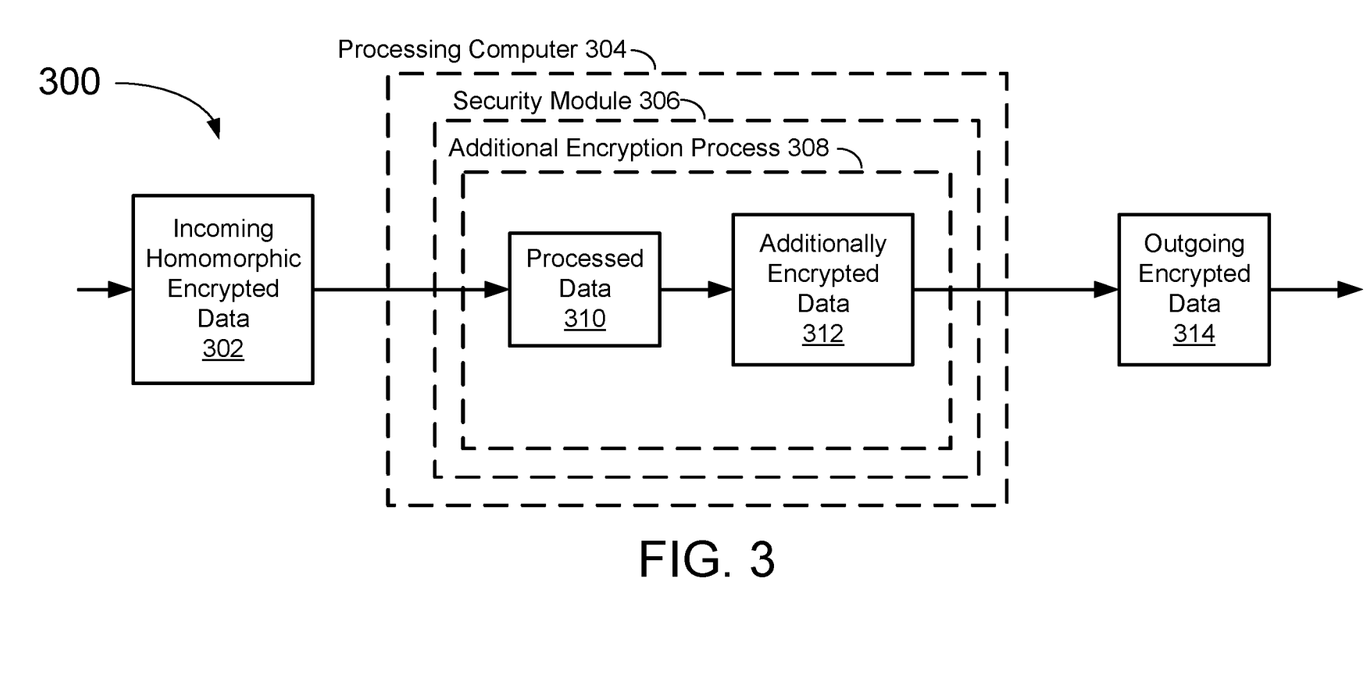
FIG. 3 depicts a data flow diagram illustrating an example data flow during additional encryption of previously encrypted data using a homomorphic encryption process, in accordance with an embodiment of the present disclosure.

FIG. 3 illustrates a sample data flow in an encryption process 300, according to an embodiment of the present disclosure. As shown in FIG. 3, the process 300 incorporates the homomorphic encryption techniques as described herein and overcomes the deficiencies of convention data processes such as process 200 as shown in FIG. 2. For example, as shown in FIG. 3, a data can be searched for and identified in response to a query received from a requesting device, the data including incoming homomorphically encrypted data 302. The incoming homomorphically encrypted data can be received by a processing computer 304 (e.g., one of security servers 108 or 118 as described above) for further processing prior to transmission to the requesting device. The processing computer 304 can initiate a software module such as security module 306 for processing the incoming homomorphically encrypted data 302. For example, the security module 306 can include instructions for causing a processor of the processing computer 304 to initiate an additional encryption process 308 to encrypt the incoming encrypted data 302 using a second encryption technique such as, for example, a public/private key pair encryption technique. For example, the query as received from the requesting device can also include a public key for encrypting data for transmission to the requesting device. The processor can process the homomorphically encrypted data by, for example, verifying the data's authenticity to produce processed data 310. The processor can then additional encrypt the processed data 310 to produce additionally encrypted data 312. In such an example, the additionally encrypted data 312 is no encrypted using a homomorphic encryption process as well as a second encryption process such as public/private key pair encryption technique. The processor can then transmit outgoing encrypted data to the requesting device.

As shown in FIG. 3, the process 300 includes added security as compared to process 200 of FIG. 2. For example, using the additional encryption process 308 results in an added layer of encryption. Thus, when the receiving device decrypts the additional encryption (e.g., using their private key), the data is still homomorphically encrypted. As one key attribute of homomorphic encryption is the ability to manipulate the homomorphically encrypted data while encrypted and, upon decrypting the homomorphic encryption, having the same result as would be achieved if the homomorphic encryption was not used, a user of the receiving device can manipulate the homomorphically encrypted data without compromising data integrity. As such, when the additional encryption is decrypted the data contained in the message is still protected against unauthorized access as a result of the homomorphic encryption.

Figure 4A:
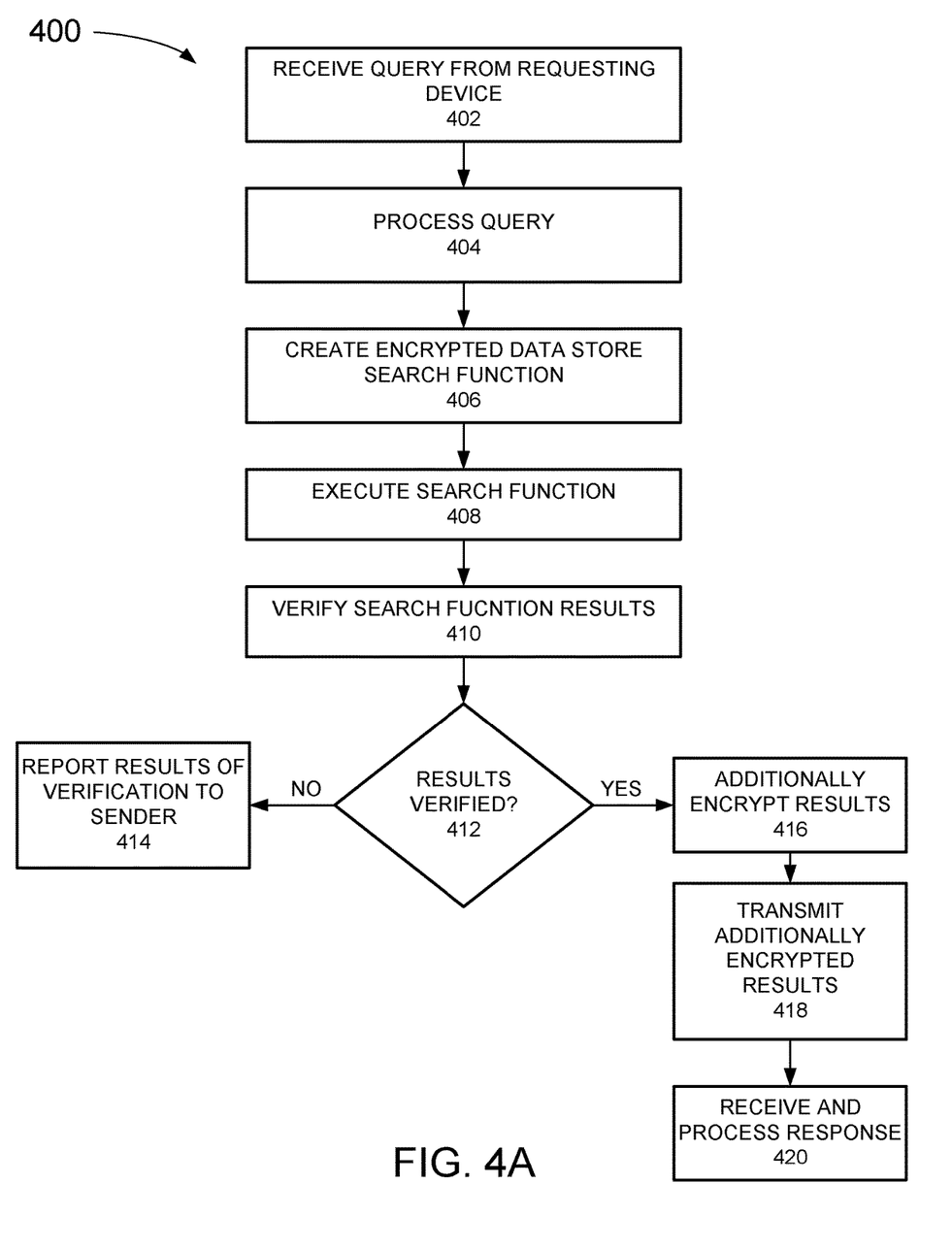
FIG. 4A illustrates a flow diagram illustrating an example process for additionally encrypting previously encrypted data using a homomorphically encrypted encryption process, in accordance with an embodiment of the present disclosure.

FIG. 4A describes a more detailed flow of a process 400 that can be performed by, for example, a processor associated with a computing device that is configured to respond to and process a query for secured data as is described herein. For example, one of security servers 108 or 118 can be configured to perform some or all of the process as shown in FIG. 4A.

As shown, process 400 is initiated when the processor receives 402 an incoming query for secured data from a requesting device. As described herein, the query can include a request for secure data currently encrypted and stored in a data store. The processor can perform 404 initial pre-processing on the received query. For example, the processor can determine what information the query is requesting, what level of security the user issuing the query has, determining one or more encryption techniques used by the requesting device, determining one or more initial hash values associated with the received encrypted message, determining an encryption technique to be used for delivery of the received encryption message to the intended recipient device, and other similar pre-processing. In some examples, the query can include a public key to be used when encrypting the search results for transmission to the requesting device.

As further shown in process 400, the processor can create 406 an encrypted data store search function. For example, the encrypted data store search function can be configured to provide added security in the event an eavesdropper is monitoring access to the data store. If one or more portions of the data store are repeatedly accessed, an eavesdropper may be able to determine that sensitive data is being stored on those portions. By including an encrypted search function that includes, for example, binary encryption with included obfuscation, the search function can reduce or eliminate the risk of an eavesdropper identifying one or more portions of the data store that include sensitive information. For example, the search function can be configured to return both expected and unexpected results. The processor can be configured to filter the results to eliminate the unexpected results, but to an eavesdropper monitoring access to the data store, the search function will return a set of data that includes data accessed from multiple portions of the data store, including portions that are not relevant to the search being performed.

As further shown in FIG. 4A, the processor can execute 408 the search function and receive a set of search results. The processor can then perform additional processing on the results such as verifying 410 the search results and filtering the search results for any unexpected results that are returned as a result of the obfuscation included in the executed search function.

If the processor determines 412 that the search results are not verified, the processor can report 414 the results of the verification to the requesting device and stop processing the search results. Conversely, if the processor does determine 412 that the message is verified, the processor can perform additional encryption 416 on the search results. For example, as noted above, the query can include a public key for use in a public/private key pair encryption technique. The requesting device maintains a copy of the private key and, as such, can decrypt data encrypted using a copy of the associated public key. The processor can additionally encrypt 416 the search results using the public key and can transmit 418 the additionally encrypted search results to the requesting device. In some examples, depending upon the intended use of the search results by the requesting device, the processor can receive 420 and process one or more responses from the requesting device.

Figure 4B:
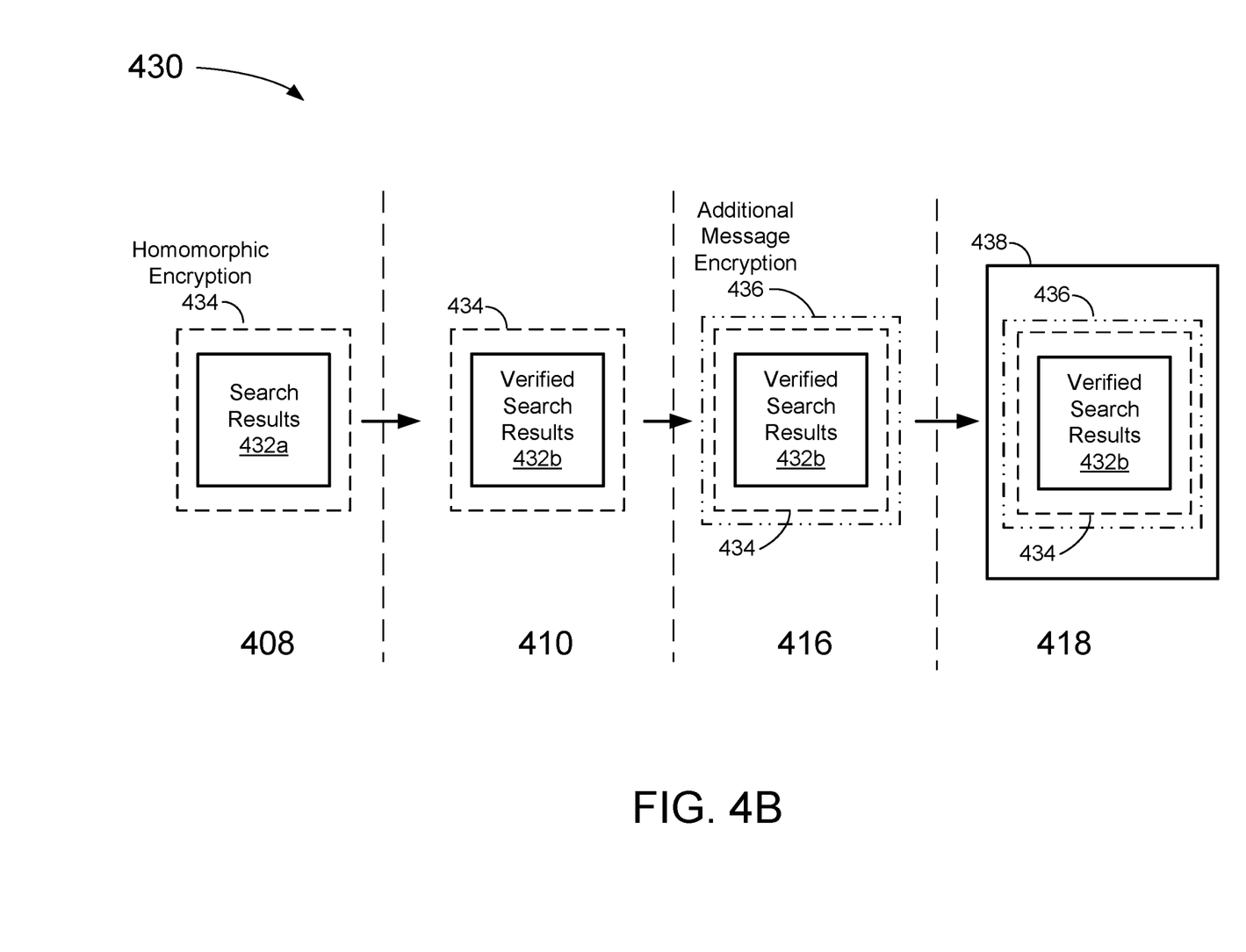
FIG. 4B illustrates a sample data flow of a message being processed using an encryption process such as that shown in FIG. 4A, in accordance with an embodiment of the present disclosure.

FIG. 4B illustrates a sample data flow 430 of a set of search results 432a. The search results 432a can be received by a processor after execution of a data store search function (e.g., step 408 as described above), the search results having an initial homomorphic encryption 434 as applied to the data included in the search results prior to storage in the data store. The processor can verify the search results (e.g., step 410 as described above) to produce verified search results 432b. After verification, the processor can execute an additional encryption process, thereby resulting in an additional message encryption 436 to the verified search results 432b (e.g., step 416 as described above). Thus, as shown in FIG. 4B, the verified search results 432b includes a primary encryption (homomorphic encryption 434) as well as a secondary encryption (additional encryption 436). The processor can then transmit a message 438 including the verified search results 432b having the homomorphic encryption 434 and the additional encryption 436 (e.g., step 418 as described above).

As described in FIG. 4A and illustrated in FIG. 4B, process 400 includes an additional encryption technique, according to an embodiment of the present disclosure. By using an additional encryption process that includes further encrypting the homomorphically encrypted search results, the information contained in the message is never unencrypted prior to or after processing and transmission. Rather, two layers of encryption are added to the message which are then sequentially processed as needed.

In a specific example, the process steps as shown in FIG. 4A can be modified accordingly to be used in processing data transmissions in a network such as network 110 shown in FIG. 1B. For example, data stored on the third-party data store 114 as shown in FIG. 1B may have a specific type of homomorphic encryption used for secure storage purposes. The security server 118 can be configured to receive a query for data from the requesting computer 120, process the query to determine what information is to be retrieved from the third-party data store 114, and retrieve the information. The security server 118 can then use the additional encryption techniques as included in process 400 to encrypt the retrieved data (e.g., the homomorphically encrypted search results) from the third-party data store 114 for secure transmission to the requesting computer 120.

Additional System Information

As described herein, the overall end-to-end encryption schemes used by the transmitting and receiving computers can include a standard random-number based encryption technique. For example, a one-time pad (OTP) encryption technique can be used. OTP is an encryption technique that uses a one-time pre-shared key the same size as, or longer than, the message being sent. In this technique, a plaintext or set of unencrypted information is paired with a random secret key (also referred to as a one-time pad). Then, each bit or character of the plaintext is encrypted by combining it with the corresponding bit or character from the pad using modular addition. If the key used is truly random, is at least as long as the plain text, is never reused in whole or in part, and is kept secret, the resulting ciphertext will be impossible to decrypt or break.

Figure 5:
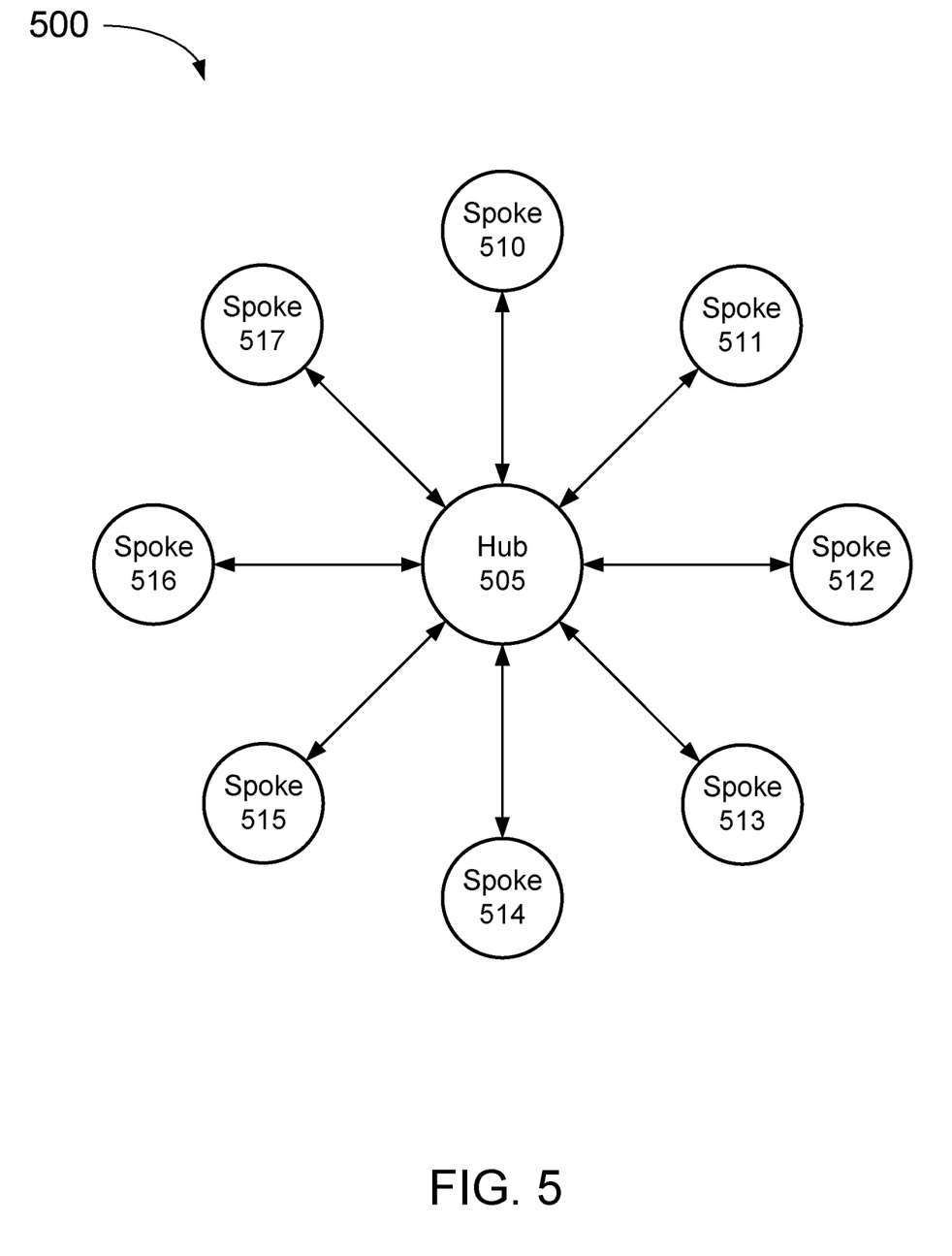
FIG. 5 depicts a block diagram illustrating a sample hub and spoke network architecture, in accordance with an embodiment of the present disclosure.

However, as noted, to use an OTP the key must be shared between users. For example, to continue the above example, for Alice to communicate with Bob, they must share a secret OTP. If Alice wishes to communicate with a third party (hereinafter termed "Charlie"), she and Charlie will need a second OTP. If Bob wants to communicate with Charlie as well, they will need a third OTP. This causes an undesirable increase in the number of secret keys being distributed throughout a group of users and increases the risk that one or more of the secret keys can be compromised. To address this problem, a spoke and wheel model can be used. For example, FIG. 5 illustrates a sample network 500 organized using a spoke and wheel model. The central hub 505 can be a trusted device such as security server 108 as described above. The hub 505 can be operably coupled to each of group member devices or spokes 510, 511, 512, 513, 514, 515, and 516 (hereinafter collectively referred to as "the spokes"). In this arrangement, the hub can store a copy of each spoke's secure key. As such, sending a message to a new member does not require a new key for each member in the network 500. For example, if spoke 517 joins network 517, it can exchange a key directly with the hub 505. Thus, existing members can simply send a message to the hub 505 with an indication that the message is directed to the new member spoke 517 and the hub can decrypt the message using the sender's secret key and encode using the new member's secret key. Thus, the burden of maintaining a large number of secret OTPs for each member in a network, as well as the risk that a secret OTP may be lost, is reduced. However, in such an arrangement, all incoming messages to the hub from one of the spokes requires re-encryption. Thus, if an eavesdropping or other similar unauthorized device is spying on the hub 505, one or more decrypted messages may be accessed prior to re-encryption. By using the homomorphic encryption techniques as described herein, the hub 505 can securely decrypt and re-encrypt all messages transmitted between the individual spokes while maintaining overall security of the homomorphically encrypted data.

For example, hub 505 can receive an encrypted message from spoke 511 that is intended to be delivered to spoke 514. Prior to sending, spoke 511 can encrypt the message using its secure key. As hub 505 has a copy of the secure key of spoke 511, the hub can decrypt the message. However, prior to decryption, the hub 505 can utilize an encryption process using a homomorphic encryption technique (e.g., the Paillier cryptosystem) as described above and apply homomorphic encryption to the message. The hub 505 can then securely decrypt the incoming encrypted message using the secret key for spoke 511 and re-encrypt the message using the secret key for spoke 514. The hub 505 can then transmit the re-encrypted message to spoke 514.

Figure 6:
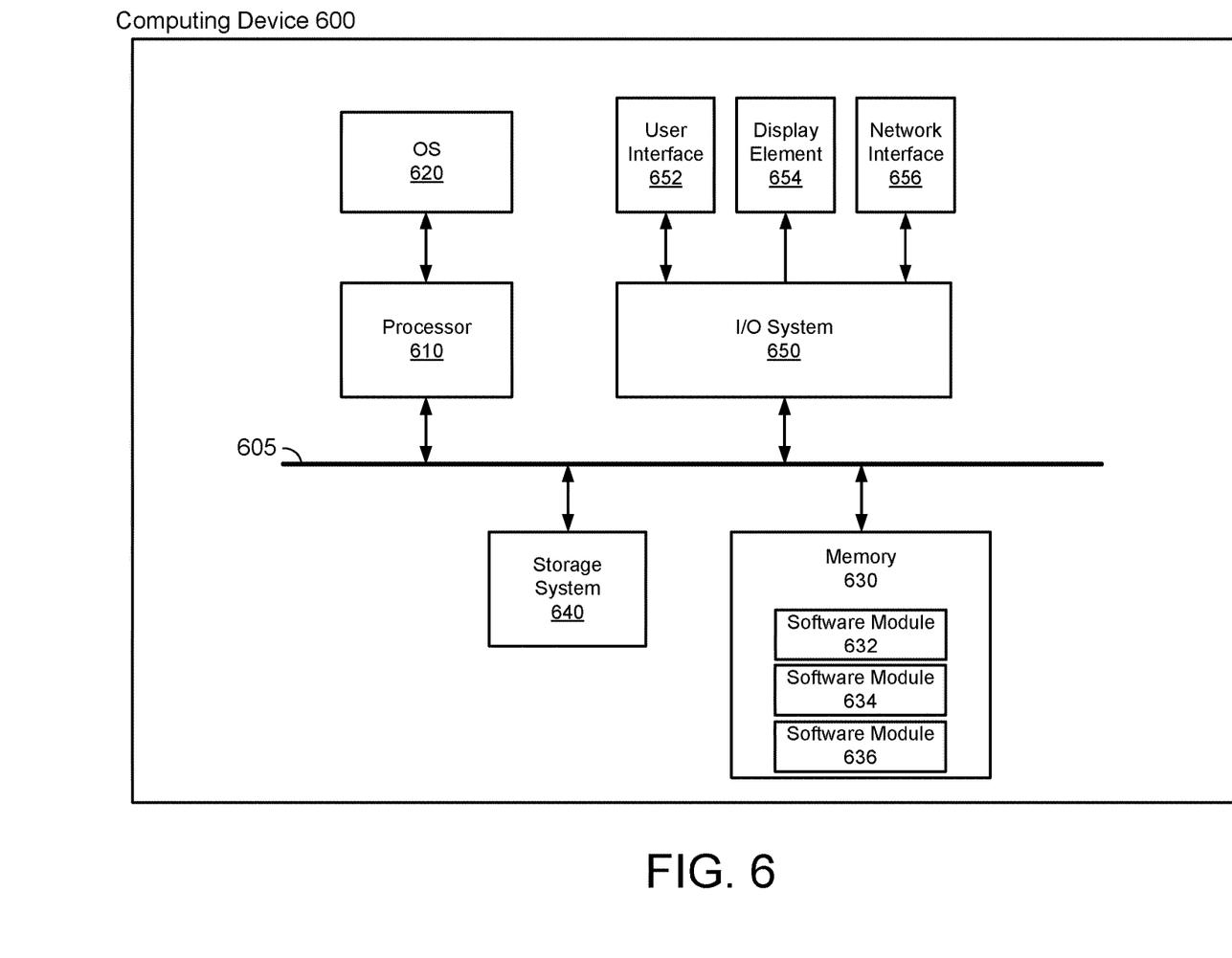
FIG. 6 depicts a block diagram of an example architecture of a computing device, in accordance with an embodiment of present disclosure.

FIG. 6 is a block diagram schematically illustrating a computing device 600, in accordance with certain of the embodiments disclosed herein. For example, computing device 600 can be used as one or more of sending computer 102, receiving computer 104, and security server 108 as described above in regard to FIG. 1A. Similarly, computing device 600 can be used as one or more of sending computer 112, security server 118, and requesting computer 120 as described above in regard to FIG. 1B.

In certain implementations, the computing device 600 can include any combination of a processor 610, a memory 630, a storage system 640, and an input/output (I/O) system 650. As can be further seen, a bus and/or interconnect 605 is also provided to allow for communication between the various components listed above and/or other components not shown. Other componentry and functionality not reflected in the block diagram of FIG. 6 will be apparent in light of this disclosure, and it will be appreciated that other embodiments are not limited to any particular hardware configuration.

The processor 610 can be any suitable processor, and may include one or more coprocessors or controllers, such as an audio processor, a graphics processing unit, or hardware accelerator, to assist in control and processing operations associated with computing device 600. In some embodiments, the processor 610 can be implemented as any number of processor cores. The processor (or processor cores) can be any type of processor, such as, for example, a microprocessor, an embedded processor, a digital signal processor (DSP), a graphics processor (GPU), a network processor, a field programmable gate array or other device configured to execute code. The processors can be multithreaded cores in that they may include more than one hardware thread context (or "logical processor") per core. Processor 610 can be implemented as a complex instruction set computer (CISC) or a reduced instruction set computer (RISC) processor.

In certain implementations, the processor 610 can be configured to execute an Operating System (OS) 620 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing device 600, and therefore may also be implemented using any suitable existing or subsequently-developed platform.

The memory 630 can be implemented using any suitable type of digital storage including, for example, flash memory and/or random-access memory (RAM). In some embodiments, the memory 630 can include various layers of memory hierarchy and/or memory caches as are known to those of skill in the art. The memory 630 can be implemented as a volatile memory device such as, but not limited to, a RAM, dynamic RAM (DRAM), or static RAM (SRAM) device. The storage system 640 can be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

In certain implementations, the memory 630 can include one or more software modules such as software module 632, software module 634, and software module 636 as shown in FIG. 6. The various software modules can include instructions that, when executed by processor 610, can cause the processor to perform one or more of the process steps and functions as described herein. For example, if computing device 600 represents the security server 108 as described herein, the various software modules 632, 634, 636 can include instructions for causing the processor 610 to implement the security module 306 to implement the additional encryption process 308 as shown in FIG. 3. Additionally, the various software modules 632, 634, 636 can include instructions for causing the processor 610 to perform the process as shown in FIG. 4A including, for example, causing the processor to receive a query from a requesting device, process the query, create an encrypted data store search function, execute the search function, verify the search results, encrypt the search results using additional encryption techniques, and cause transmission of the additionally encrypted search results to the requesting device.

The I/O system 650 can be configured to interface between various I/O devices and other components of the computing device 600. I/O devices may include, but not be limited to, a user interface 652, a display element 654, and a network interface 656.

It will be appreciated that in some embodiments, the various components of computing device 600 can be combined or integrated in a system-on-a-chip (SoC) architecture. In some embodiments, the components may be hardware components, firmware components, software components or any suitable combination of hardware, firmware or software.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the computing device 600 can include additional, fewer, or alternative subcomponents as compared to those included in the example embodiment of FIG. 6.

Further Example Embodiments

The following examples pertain to further embodiments, from which numerous permutations and configurations will be apparent. It should be noted that the following examples are directed to implementations involving the sending device transmitting encrypted data in response to a query for the encrypted data, but similar examples can be envisioned regarding the security server and the recipient device as described herein.

Example 1 includes a computer program product including one or more non-transitory machine-readable mediums encoded with instructions that when executed by one or more processors cause a process to be carried out securely processing a search query for homomorphically encrypted search results, the process including receiving a search query from a requesting device, the search query including a request for encrypted data stored in a data store operably coupled to the one or more processors; executing a search function, based upon the search query, to access a set of search results from the data store, the search results responsive to the search query and including homomorphically encrypted information included in the encrypted data; determining, based upon the search query, a transmission encryption technique for secure transmission of the search results to the requesting device; additionally encrypting the search results using the transmission encryption technique to generate an additionally encrypted search response; and causing transmission of the additionally encrypted search response to the requesting device.

Example 2 includes the subject matter of Example 1, wherein the search query includes an encryption key identifying the transmission encryption technique.

Example 3 includes the subject matter of Example 2, wherein additionally encrypting the search results using the transmission encryption technique includes additionally encrypting the search results using the encryption key.

Example 4 includes the subject matter of any of the preceding Examples, wherein executing the search function includes generating the search function based upon the search query and executing the search function to produce an initial set of search results including expected and unexpected results.

Example 5 includes the subject matter of Example 4, further including filtering the initial set of search results to remove the unexpected search results, thereby generating the set of search results.

Example 6 includes the subject matter of Example 4 or 5, wherein generating the search function includes encrypting the search function using a binary encryption technique.

Example 7 includes the subject matter of Example 6, wherein encrypting the search function using a binary encryption technique further includes configuring the search function to obfuscate the search results.

Example 8 includes a method for securely processing a search query for homomorphically encrypted search results, the method including receiving, by a processor, a search query from a requesting device, the search query including a request for encrypted data stored in a data store operably coupled to the one or more processors; executing, by the processor, a search function, based upon the search query, to access a set of search results from the data store, the search results responsive to the search query and including homomorphically encrypted information included in the encrypted data; determining, by the processor, a transmission encryption technique based upon the search query for secure transmission of the search results to the requesting device; additionally encrypting, by the processor, the search results using the transmission encryption technique to generate an additionally encrypted search response; and causing, by the processor, transmission of the additionally encrypted search response to the requesting device.

Example 9 includes the subject matter of Example 8, wherein the search query includes an encryption key identifying the transmission encryption technique.

Example 10 includes the subject matter of Example 9, wherein additionally encrypting the search results using the transmission encryption technique includes additionally encrypting the search results using the encryption key.

Example 11 includes the subject matter of any of Examples 8-10, wherein executing the search function includes generating the search function based upon the search query and executing the search function to produce an initial set of search results including expected and unexpected results.

Example 12 includes the subject matter of Example 11, further including filtering the initial set of search results to remove the unexpected search results, thereby generating the set of search results.

Example 13 includes the subject matter of Example 11 or 12, wherein generating the search function includes encrypting the search function using a binary encryption technique.

Example 14 includes the subject matter of Example 13, wherein encrypting the search function using a binary encryption technique further includes configuring the search function to obfuscate the search results.

Example 15 includes a device for securely processing a search query for homomorphically encrypted search results, the device including one or more non-transitory machine-readable mediums encoded with instructions and one or more processors operably coupled to the one or more non-transitory machine-readable mediums and configured to execute the instructions, wherein execution of the instructions causes the one or more processors to receive a search query from a requesting device, the search query including a request for encrypted data stored in a data store operably coupled to the one or more processors, execute a search function, based upon the search query, to access a set of search results from the data store, the search results responsive to the search query and including homomorphically encrypted information included in the encrypted data, determine, based upon the search query, a transmission encryption technique for secure transmission of the search results to the requesting device, additionally encrypt the search results using the transmission encryption technique to generate an additionally encrypted search response, and cause transmission of the additionally encrypted search response to the requesting device.

Example 16 includes the subject matter of Example 15, wherein the search query includes an encryption key identifying the transmission encryption technique.

Example 17 includes the subject matter of Example 16, wherein additionally encrypting the search results using the transmission encryption technique includes additionally encrypting the search results using the encryption key.

Example 18 includes the subject matter of any of Examples 15-17, wherein executing the search function includes generating the search function based upon the search query and executing the search function to produce an initial set of search results including expected and unexpected results.

Example 19 includes the subject matter of Example 18, further including filtering the initial set of search results to remove the unexpected search results, thereby generating the set of search results.

Example 20 includes the subject matter of Example 18 or 19, wherein generating the search function includes encrypting the search function using a binary encryption technique.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer program product comprising one or more non-transitory machine-readable mediums encoded with instructions that when executed by one or more processors cause a process to be carried out securely processing a search query for homomorphically encrypted search results, the process comprising:
   receiving a search query from a requesting device, the search query including a request for encrypted data stored in a data store operably coupled to the one or more processors and further including information related to encryption and decryption capabilities of the requesting device;
   executing a search function, based upon the search query, to access a set of search results from the data store, the set of search results responsive to the search query and comprising homomorphically encrypted information included in the encrypted data;
   determining, based upon the search query, a transmission encryption technique for secure transmission of set of to the requesting device, wherein the transmission encryption technique is further adjusted according to the requesting device encryption and decryption capabilities information received with the search query;
   additionally encrypting the set of search results using the transmission encryption technique to generate an additionally encrypted search response; and
   causing transmission of the additionally encrypted search response to the requesting device.

2. The computer program product of claim 1, wherein the search query comprises an encryption key identifying the transmission encryption technique.

3. The computer program product of claim 2, wherein additionally encrypting the set of search results using the transmission encryption technique comprises additionally encrypting the set of search results using the encryption key.

4. The computer program product of claim 1, wherein executing the search function comprises:
   generating the search function based upon the search query; and
   executing the search function to produce an initial set of search results comprising expected and unexpected results.

5. The computer program product of claim 4, further comprising filtering the initial set of search results to remove the unexpected search results, thereby generating the set of search results.

6. The computer program product of claim 4, wherein generating the search function comprises encrypting the search function using a binary encryption technique.

7. The computer program product of claim 6, wherein encrypting the search function using a binary encryption technique further comprises configuring the search function to obfuscate the set of search results.

8. A method for securely processing a search query for homomorphically encrypted search results, the method comprising:
   receiving, by a processor, a search query from a requesting device, the search query including a request for encrypted data stored in a data store operably coupled to the one or more processors and further including information related to encryption and decryption capabilities of the requesting device;
   executing, by the processor, a search function, based upon the search query, to access a set of search results from the data store, the set of search results responsive to the search query and comprising homomorphically encrypted information included in the encrypted data;
   determining, by the processor, a transmission encryption technique based upon the search query for secure transmission of the set of search results to the requesting device wherein the transmission encryption technique is further adjusted according to the requesting device encryption and decryption capabilities information received with the search query;
   additionally encrypting, by the processor, the set of search results using the transmission encryption technique to generate an additionally encrypted search response; and
   causing, by the processor, transmission of the additionally encrypted search response to the requesting device.

9. The method of claim 8, wherein the search query comprises an encryption key identifying the transmission encryption technique.

10. The method of claim 9, wherein additionally encrypting the set of search results using the transmission encryption technique comprises additionally encrypting the set of search results using the encryption key.

11. The method of claim 8, wherein executing the search function comprises:
   generating the search function based upon the search query; and
   executing the search function to produce an initial set of search results comprising expected and unexpected results.

12. The method of claim 11, further comprising filtering the initial set of search results to remove the unexpected search results, thereby generating the set of search results.

13. The method of claim 11, wherein generating the search function comprises encrypting the search function using a binary encryption technique.

14. The method of claim 13, wherein encrypting the search function using a binary encryption technique further comprises configuring the search function to obfuscate the set of search results.

15. A device for securely processing a search query for homomorphically encrypted search results, the device comprising:
one or more non-transitory machine-readable mediums encoded with instructions; and
one or more processors operably coupled to the one or more non-transitory machine-readable mediums and configured to execute the instructions, wherein execution of the instructions causes the one or more processors to
receive a search query from a requesting device, the search query including a request for encrypted data stored in a data store operably coupled to the one or more processors and further including information related to encryption and decryption capabilities of the requesting device,
execute a search function, based upon the search query, to access a set of search results from the data store, the set of search results responsive to the search query and comprising homomorphically encrypted information included in the encrypted data,
determine, based upon the search query, a transmission encryption technique for secure transmission of the set of search results to the requesting device, wherein the transmission encryption technique is further adjusted according to the requesting device encryption and decryption capabilities information received with the search query,
additionally encrypt the set of search results using the transmission encryption technique to generate an additionally encrypted search response, and
cause transmission of the additionally encrypted search response to the requesting device.

16. The device of claim 15, wherein the search query comprises an encryption key identifying the transmission encryption technique.

17. The device of claim 16, wherein additionally encrypting the set of search results using the transmission encryption technique comprises additionally encrypting the set of search results using the encryption key.

18. The device of claim 15, wherein executing the search function comprises:
generating the search function based upon the search query; and
executing the search function to produce an initial set of search results comprising expected and unexpected results.

19. The device of claim 18, further comprising filtering the initial set of search results to remove the unexpected search results, thereby generating the set of search results.

20. The device of claim 18, wherein generating the search function comprises encrypting the search function using a binary encryption technique.

\* \* \* \* \*